United States Patent [19]

Suzuki et al.

[11] 4,371,216

[45] Feb. 1, 1983

[54] FLUID BEARING

[75] Inventors: Hiroshi Suzuki, Okazaki; Kunio Shibata, Kariya; Kazuhiko Sugita, Anjo, all of Japan

[73] Assignee: Toyoda Koki Kabushiki Kaisha, Kariya, Japan

[21] Appl. No.: 213,213

[22] Filed: Dec. 5, 1980

Related U.S. Application Data

[62] Division of Ser. No. 53,038, Jun. 28, 1979, Pat. No. 4,285,551.

[30] Foreign Application Priority Data

| Jul. 3, 1978 | [JP] | Japan | 53-80696 |
| Jul. 3, 1978 | [JP] | Japan | 53-80697 |
| Jul. 24, 1978 | [JP] | Japan | 53-90098 |
| Aug. 2, 1978 | [JP] | Japan | 53-94427 |
| Dec. 27, 1978 | [JP] | Japan | 53-161527 |
| Dec. 27, 1978 | [JP] | Japan | 53-161528 |

[51] Int. Cl.³ ............................................. F16C 32/06
[52] U.S. Cl. .................................................... 384/118
[58] Field of Search .................... 308/9, 122, DIG. 1, 308/DIG. 15, 121, 78

[56] References Cited

U.S. PATENT DOCUMENTS

| 3,454,311 | 7/1969 | Tomita et al. | 308/122 |
| 3,726,573 | 4/1973 | Unno | 308/9 |
| 3,785,708 | 1/1974 | Miyasaki | 308/122 |
| 3,945,692 | 3/1976 | Tsujinchi | 308/122 |

Primary Examiner—Lenard A. Footland
Attorney, Agent, or Firm—Oblon, Fisher, Spivak, McClelland & Maier

[57] ABSTRACT

A fluid bearing for rotatably supporting a rotary shaft. A plurality of pressure generating zones are defined on a bearing surface of a bearing member in a circumferential direction. Each of the pressure generating zones comprises a pair of axially spaced fluid pockets, at least one raised land formed in at least one of the pair of fluid pockets, a passage member for fluidically communicating the pair of fluid pockets with each other, a throttle member connected to the fluid pockets for admitting pressurized fluid therein and an exhaust port formed on the raised land for discharging pressurized fluid. An exhaust member is formed on the bearing surface outside the pressure generating zones for discharging pressurized fluid.

2 Claims, 26 Drawing Figures

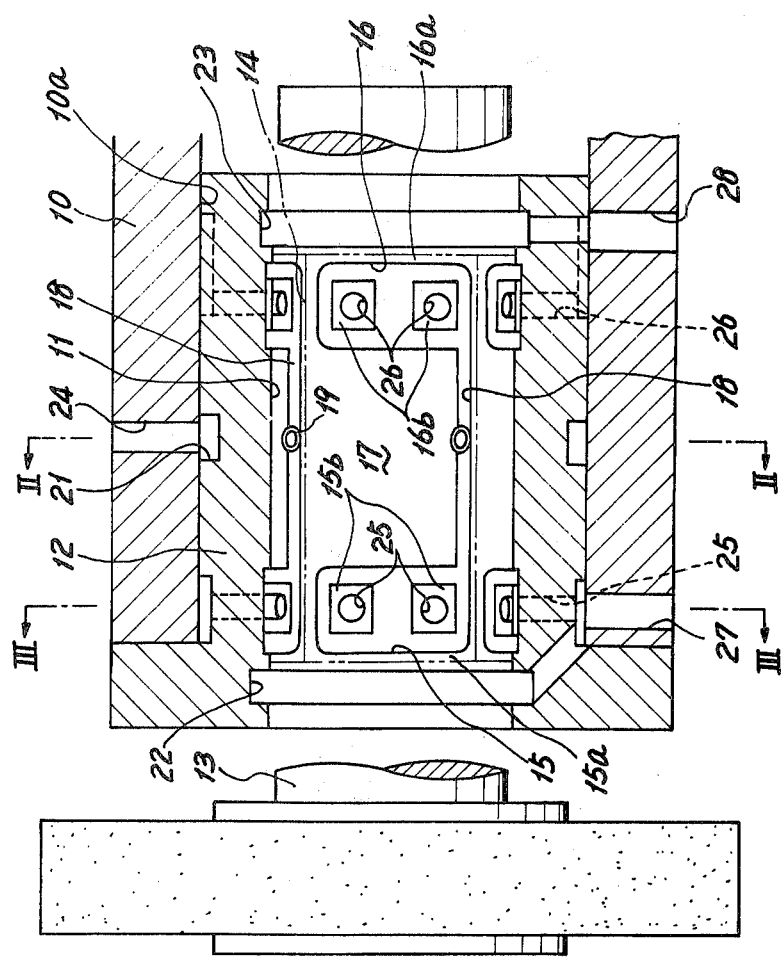

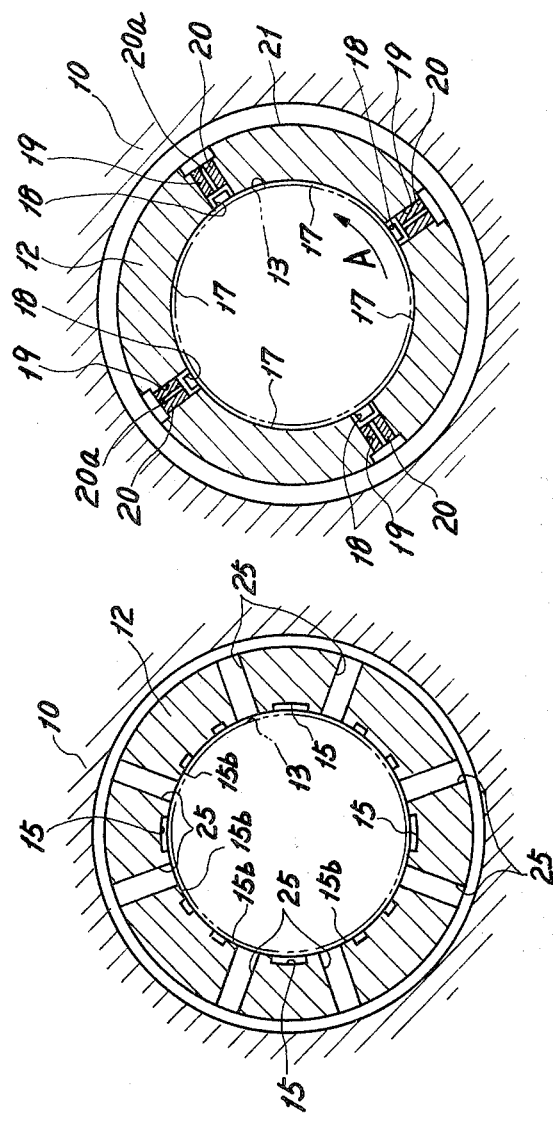

Fig. 6
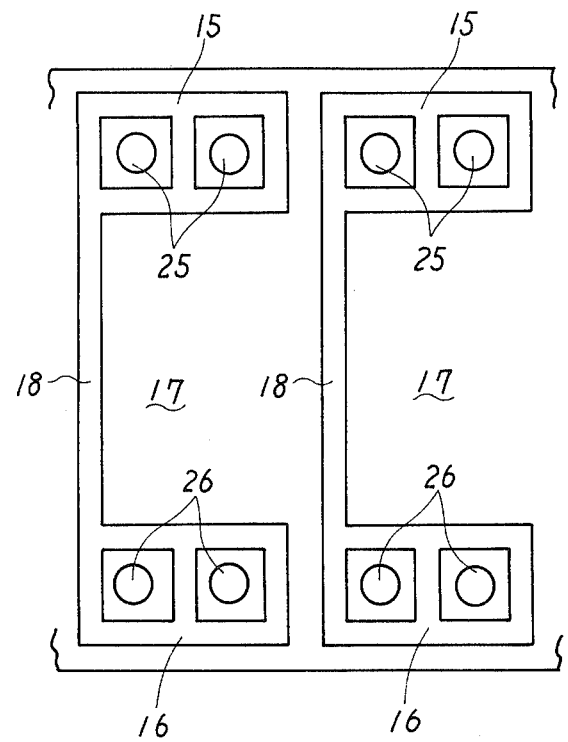
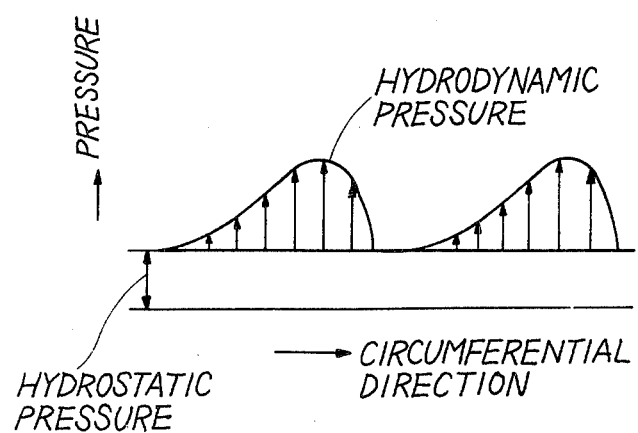

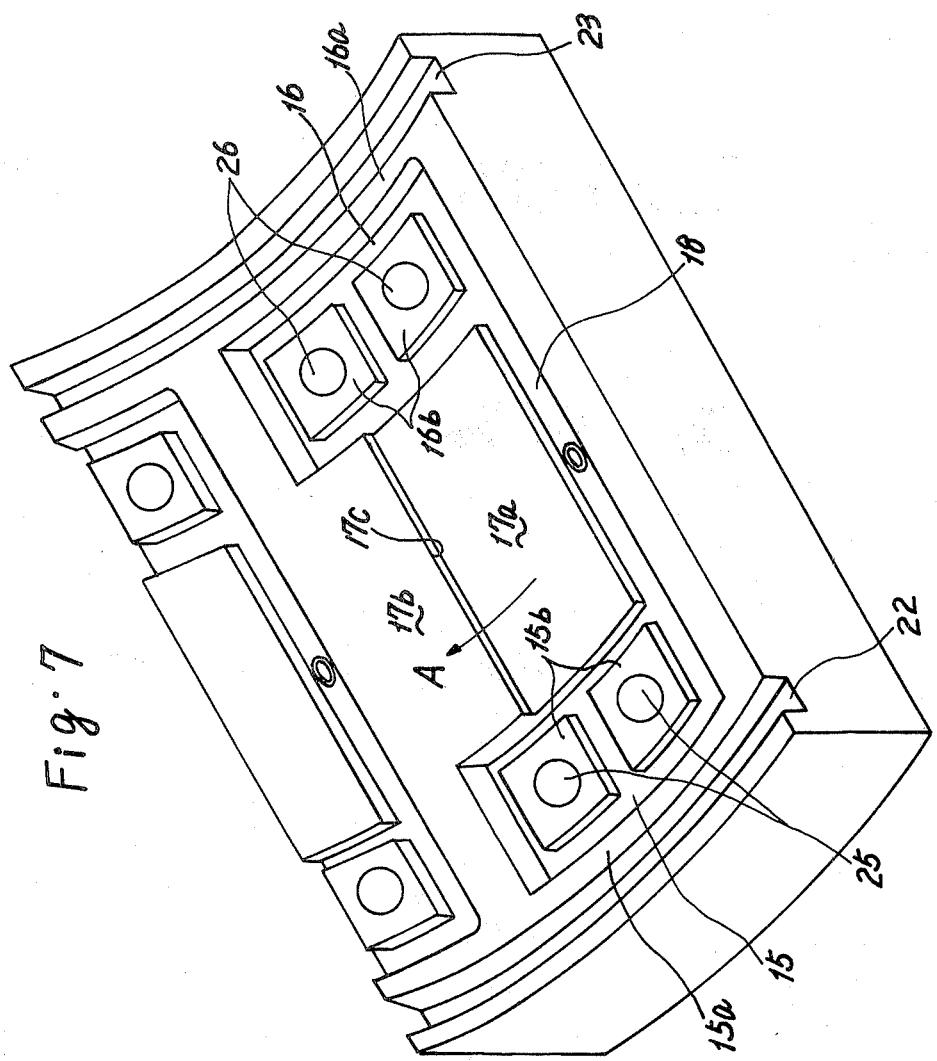

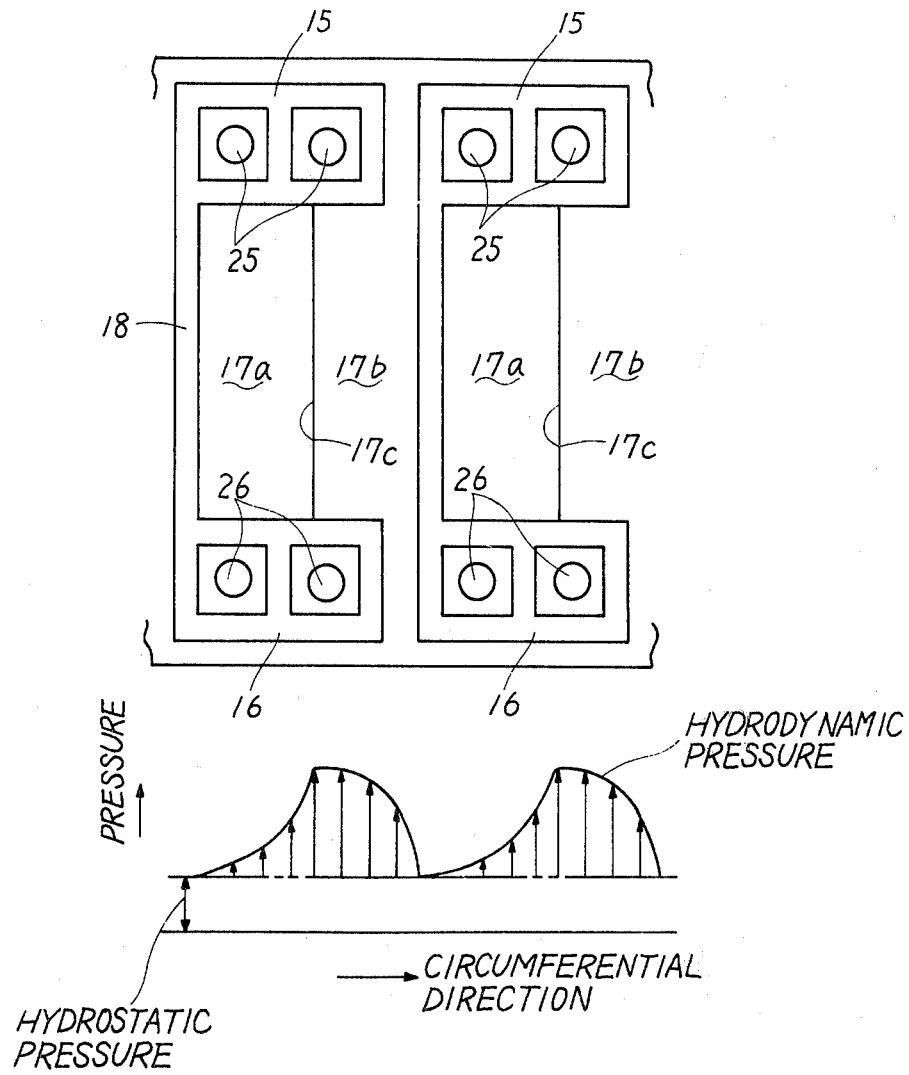

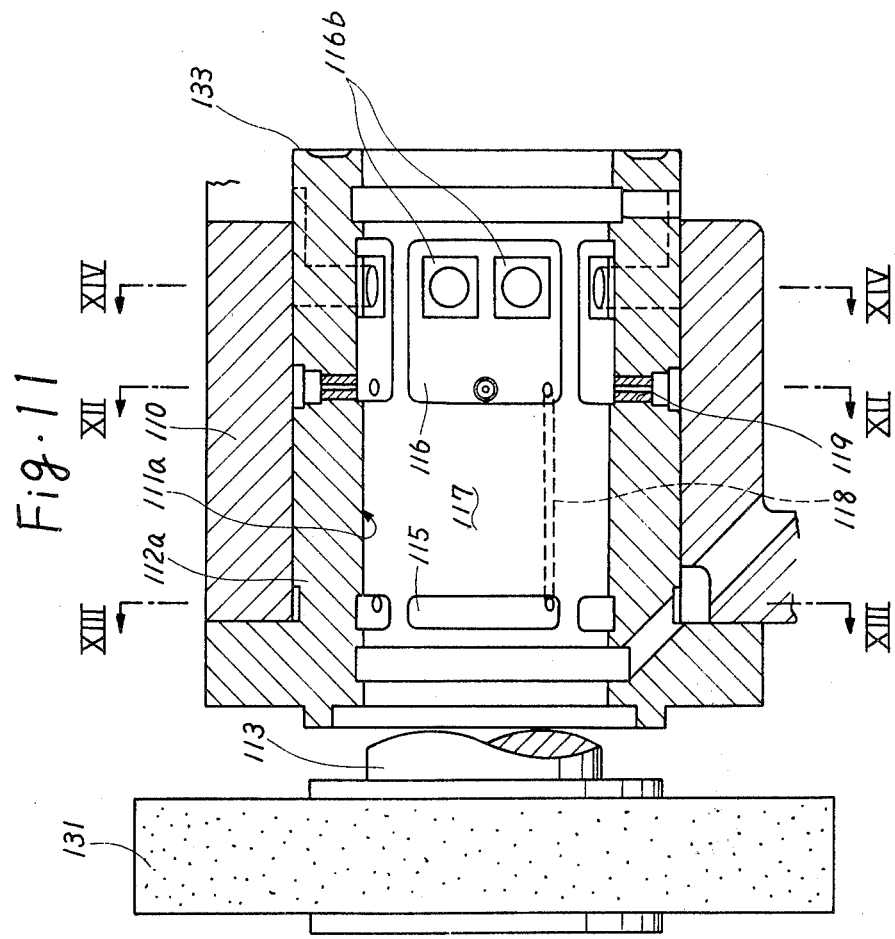

FLUID BEARING

This is a division, of application Ser. No. 53,038, filed June 28, 1979, now U.S. Pat. No. 4,285,551.

BACKGROUND OF THE INVENTION

1. Field of the Invention

The present invention relates to a fluid bearing for supporting a rotary shaft by means of a pressurized fluid.

2. Description of the Prior Art

In general, a bearing device for a spindle of a machine tool is subjected to an excessive load, such as vibration load, during machining operation. A bearing device depending on only a static bearing support may not be able to bear such excessive load. For this reason, there has been required a fluid bearing capable of heightening bearing rigidity during rotation of the spindle.

In a conventional fluid bearing, a hydrodynamic pressure generating zone was formed on the bearing surface in addition to a hydrostatic pressure generating zone in order to increase the bearing rigidity during rotation of the spindle. A typical example was such that a land portion was formed within a fluid pocket. However, since the land portion was formed within the fluid pocket, it was difficult to enlarge the area of hydrodynamic pressure generating zone. It was also difficult to extremely decrease the diameter of a throttle formed on the fluid pocket fur supply of pressurized fluid in order to prevent the same from being clogged by a foreign substance, and to increase the amount of fluid flow from the fluid pocket. For these reasons, the clearance between the spindle and the bearing surface had to be made larger than that of the usual plain bearing in order to get a throttle ratio required for proper construction of the hydrostatic bearing which resulted in lowering the hydrodynamic effect.

In order to overcome this disadvantage, it has been considered to enclose the fluid pocket by exhaust grooves to increase the amount of fluid flow so that the clearance between the spindle and the bearing surface may be made smaller. However, according to this construction, the exhaust grooves communicating with atmosphere were formed axially of the bearing surface so that air was sucked into the bearing surface as the spindle was rotated, resulting in cavitation. In particular, since a plurality of pressure generating zones, each being constituted by the exhaust grooves and the land portion, were arranged in the circumferential direction, compressible fluid resulting from the mixture of air was supplied to the land portions. Accordingly, hydrodynamic pressure was not as high as expected and thus whirling of the spindle being rotated at high speed was produced.

SUMMARY OF THE INVENTION

It is therefore an object of the present invention to provide a new and improved fluid bearing capable of heightening a hydrodynamic pressure.

Another object of the present invention is to provide a new and improved fluid bearing capable of preventing air from being sucked into land portions thereof as the rotary shaft is rotated, whereby the hydrodynamic pressure is increased.

Another object of the present invention is to provide a new and improved fluid bearing, wherein bearing rigidity in a rotational state of the rotary shaft is higher than that in a stationary state.

A further object of the present invention is to provide a new and improved fluid bearing capable of preventing bearing seizure even if the rotary shaft continues to rotate due to its inertia immediately after the electric supply is interrupted and thus, supply of pressurized fluid is stopped.

Briefly, according to the present invention, these and other objects are achieved by providing a fluid bearing for rotatably supporting a rotary shaft, as mentioned below. A bearing member is fixedly inserted in a stationary housing and has an internal bore forming a bearing surface. A plurality of pressure generating zones are defined on the bearing surface in a circumferential direction. A pair of axially spaced fluid pockets are formed in each of the pressure generating zones. At least one raised land is formed in at least one of the pair of fluid pockets. Passage means is provided for fluidically communicating the pair of fluid pockets with each other. A throttle means is connected to the fluid pockets for admitting pressurized fluid therein. An exhaust port is formed on the raised land for discharging pressurized fluid and an exhaust means is formed on the bearing surface outside the pressure generating zones for discharging pressurized fluid.

BRIEF DESCRIPTION OF THE DRAWINGS

The foregoing and other objects and many of the attendant advantages of the present invention will be readily appreciated as the same becomes better understood by reference to the following detailed description when considered in connection with the accompanying drawings, in which:

FIG. 1 is a longitudinal sectional view of a fluid bearing according to the present invention;

FIGS. 2 and 3 are sectional views taken along lines II—II and III—III in FIG. 1, respectively;

FIG. 6 shows the change in the hydrodynamic pressure at the hydrodynamic pressure generating zone in the circumferential direction;

FIG. 7 shows another modification, wherein the land portion is stepped into two portions;

FIG. 8 shows change in the hydrodynamic pressure at the hydrodynamic pressure generating zone in the circumferential direction in the modification shown in FIG. 7;

FIG. 11 is an enlarged sectional view of the bearing member on the side of the grinding wheel shown in FIG. 10;

DETAILED DESCRIPTION OF THE PREFERRED EMBODIMENTS

Figure 4:
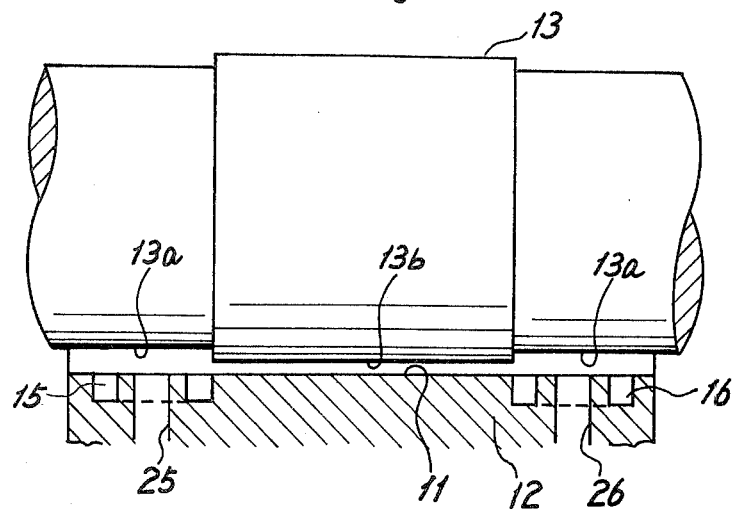
FIGS. 4 and 5 show modifications of the embodiment shown in FIGS. 1 to 3, wherein the clearance with the rotary shaft at the hydrodynamic pressure generating zone is made smaller than that at the hydrostatic pressure generating zone.

Referring now to the drawings, wherein like reference numerals or characters refer to identical or corresponding parts throughout the several views, and more particularly to FIG. 1, there is shown a fluid bearing provided with a stationary housing 10 having an inner bore 10a, within which a bearing member 12 is fixedly inserted. The bearing member 12 is provided with an inner bore or bearing surface 11 which is formed coaxially with the bore 10a of the housing 10. The bearing surface 11 provides rotatable support of a rotary shaft 13, subjected to a radial load at one end thereof, by means of pressurized fluid supplied into a small clearance formed between the bearing surface 11 and the outer surface of the rotary shaft 13. As shown in dotted lines in FIG. 1, a plurality of pressure generating zones 14 are circumferentially arranged on the bearing surface 11 of the bearing member 12. Each of the pressure generating zones 14 is provided with a pair of axially spaced fluid pockets 15 and 16, which are rectangular in shape and have the same axial width, a land portion 17 of the bearing surface 11 formed between the pair of fluid pockets 15 and 16, and a supply groove 18 formed on the land portion 17 in parallel relationship with the axis of the bearing member 12 for connecting one member of the fluid pocket 15 and one member of the fluid pocket 16.

On the middle of the supply groove 18, a supply port 19 is formed and extends to the outer periphery of the bearing member 12, as shown in FIG. 2. A throttle member 20 having a small throttle bore 20a is interposed in the supply port 19. The supply port 19 communicates with an annular groove 21 formed on the outer periphery of the bearing member 12. The annular groove 21 communicates, in turn, with a supply passage 24 formed on the bearing housing 10, so as to receive pressurized fluid from a pressure fluid supply pump [not shown]. A pair of annular exhaust grooves 22 and 23 are formed on the bearing surface 11 outside the pressure generating zones 14 so as to form annular land portions 15a and 16a of the bearing surface 11 between the same and the fluid pockets 15 and 16, respectively. The annular land portions 15a and 16a serve as resistance against flow of pressurized fluid. Small raised lands 15b and 16b forming a small clearance with the rotary shaft 13, as shown in FIG. 3, are circumferentially arranged within the pockets 15 and 16, respectively. Exhaust ports 25 and 26 are formed on the respective small raised lands 15b and 16b. The exhaust groove 22 and the exhaust ports 25 communicate with an exhaust passage 27 formed on the housing 10, while the exhaust groove 23 and the exhaust ports 26 communicate with an exhaust passage 28 formed on the housing 10. The exhaust passages 27 and 28 are connected through the atmosphere to a reservoir (not shown). The above-described fluid pockets 15 and 16 serve as a hydrostatic pressure generating zone, while the land portion 17 serves as a hydrodynamic pressure generating zone.

The land portion 17 and the annular land portions 15a, 16a of the bearing surface 11 and the small raised lands 15b, 16b are formed in a circular shape in cross section with the same radius and axis. The diameter of the rotary shaft 13 is formed to be uniform in the axial direction so as to have the same clearance with both the hydrostatic pressure generating zone and the hydrodynamic pressure generating zone.

In operation, when pressurized fluid is supplied into the supply passage 24 from the supply pump (not shown) under the state that the rotary shaft 13 is not rotated, this pressurized fluid is admitted from the annular groove 21 through each of the throttle bores 20a of the throttle members 20 and the supply grooves 18 into the respective fluid pockets 15 and 16 to form a fluid film between the rotary shaft 13 and the bearing surface 11. Pressurized fluid within the fluid pockets 15 and 16 is exhausted from the exhaust grooves 22 and 23 and the respective exhaust ports 25 and 26 through the clearance formed between the rotary shaft 13 and the annular land portions 15a, 16a and the small raised lands 15b, 16b into the exhaust passages 27 and 28. As a result, hydrostatic pressure depending upon the flow resistance or the clearance at the annular land portions 15a, 16a and the small raised lands 15b, 16b is generated at the hydrostatic pressure generating zones constituted by the fluid pockets 15 and 16 to support the rotary shaft 13.

Since each of the land portions 17 is enclosed by the fluid pockets 15 and 16 and the supply groove 18 to restrict fluid flow therefrom, the land portion 17 also generates hydrostatic pressure.

When the rotary shaft 13 is rotated in a direction as indicated by an arrow A in FIG. 2, pressurized fluid supplied into each of the supply passages 18 is sucked and introduced into the clearance between each of the land portions 17 and the rotary shaft 13 to thereby generate hydrodynamic pressure which is higher than the hydrostatic pressure.

Since only the supply passages 18 supplied with pressurized fluid are arranged in the circumferential direction of the land portions 17, air is not sucked in the land portions 17 as the rotary shaft 13 is rotated, which results in an increase in the hydrodynamic pressure.

Figure 5:
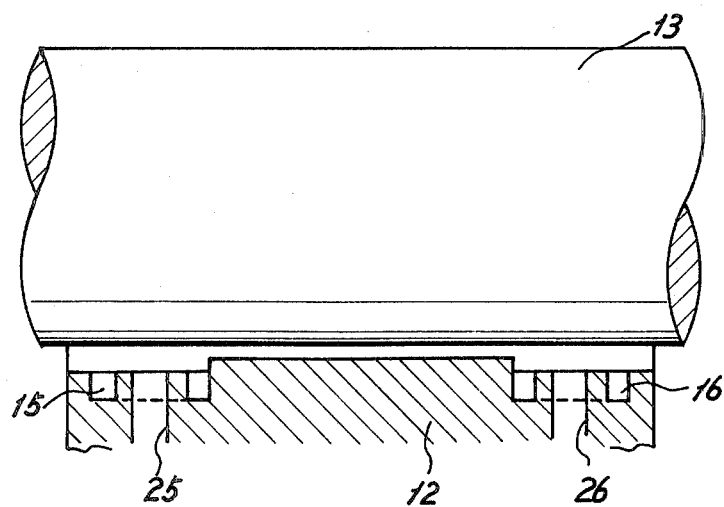

FIGS. 4 and 5 show modifications of the embodiment shown in FIGS. 1 to 3, wherein the clearance with the rotary shaft 13 at the hydrodynamic pressure generating zone is made smaller than that at the hydrostatic pressure generating zone in order to increase the hydrodynamic pressure. In FIG. 4, the diameter of the rotary shaft 13b at the hydrodynamic pressure generating zone is formed to be larger than that 13a at the hydrostatic pressure generating zone, while the diameter of the bearing surface 11 of the bearing member 12 is uniform in the axial direction. In FIG. 5, the diameter of the bearing surface at the hydrodynamic pressure generating zone is formed to be smaller than that at the hydrostatic pressure generating zone, while the diameter of the rotary shaft 13 is uniform in the axial direction.

By forming the clearance with the rotary shaft 13 at the hydrodynamic pressure generating zone to be smaller than that at the hydrostatic pressure generating zone, hydrodynamic pressure at the hydrodynamic pressure generating zone changes in the circumferential direction, as shown in FIG. 6.

FIG. 7 shows another modification in order to further increase the hydrodynamic pressure. The land portion 17 is stepped into two portions 17a and 17b in the circumferential direction. The land portion 17b is formed in a circular shape in cross section to have the same radius and axis with the annular land portions 15a, 16a and the small raised lands 15b, 16b. The land portion 17a, surrounded by the pair of fluid pockets 15, 16 and the supply groove 18, is also formed in a circular shape in cross section and has the same axis with the land portion 17b. However, the radius of the land portion 17a is a little larger than that of the land portion 17b.

By forming the land portion 17 into two stepped land portions 17a and 17b, the hydrodynamic pressure changes in the circumferential direction, as shown in FIG. 8. It is seen that from FIG. 8 that the hydrodynamic pressure is maximum at the stepped point 17c.

Figure 9:
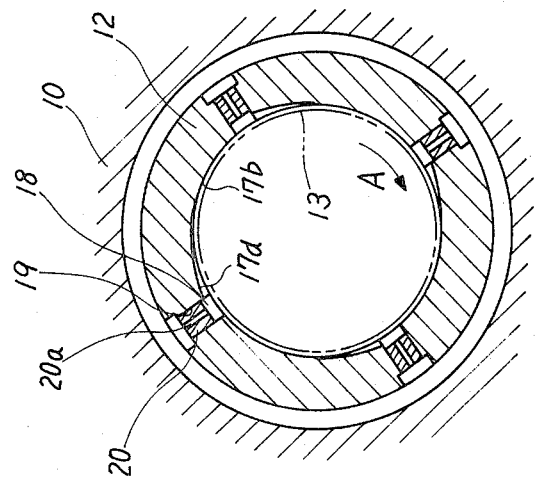
FIG. 9 shows still another modification, wherein the land portion is separated into two portions to form a wedge-shaped clearance with the rotary shaft.
Figure 12:
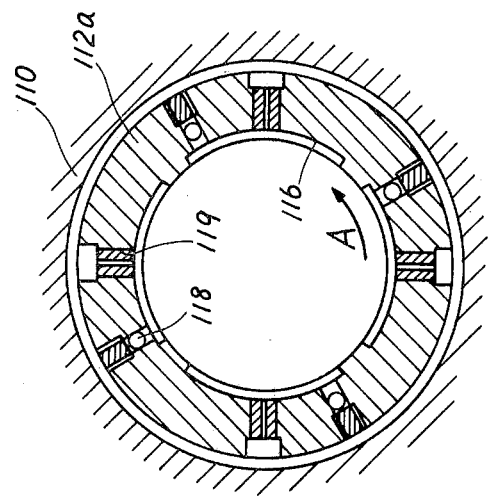
FIGS. 12 to 14 are sectional views taken along lines XII—XII to XIV—XIV in FIG. 11, respectively.
Figure 13:
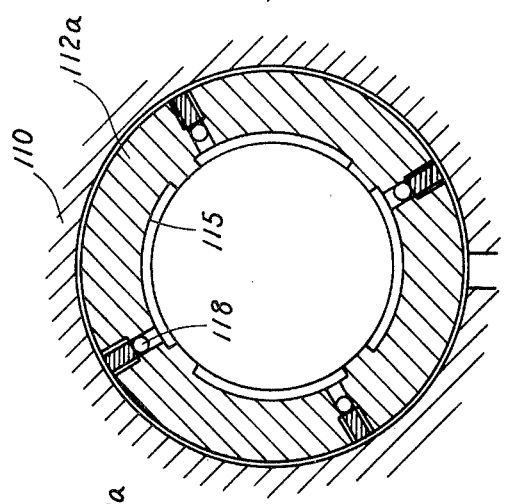
Figure 14:
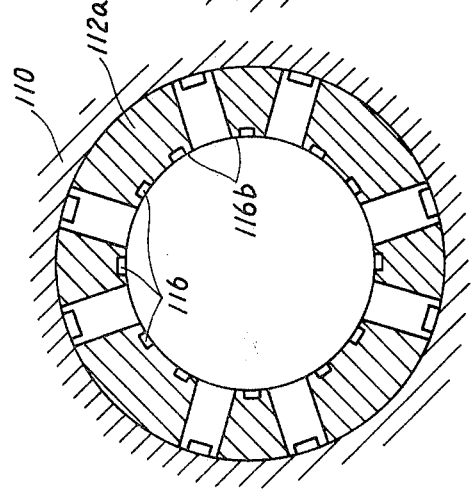

FIG. 9 shows still another modification for increasing the hydrodynamic pressure. The land portion 17 is separated into two portions 17b and 17d in the circumferential direction. The land portion 17b is formed in a circular shape in cross section to have the same radius and axis with the annular land portions 15a, 16a and the small raised lands 15b, 16b, as in the modification in FIG. 7. However, the radius of the land portion 17d is gradually decreased in the rotational direction A of the rotary shaft 13 with respect to the axis of the land portion 17b, and is smoothly connected to the land portion 17b to form a wedge-shaped clearance with the rotary shaft 13.

Figure 10:
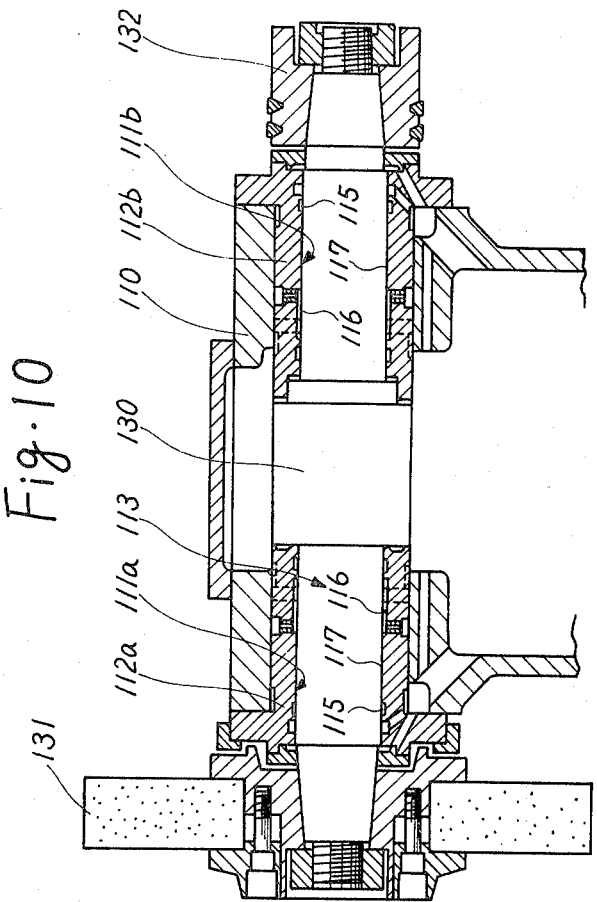
FIG. 10 is a longitudinal sectional view of another fluid bearing according to the present invention.

Another embodiment of the present invention will now be described with reference to FIGS. 10 to 14. As shown in FIG. 10, a pair of bearing members 112a and 112b are inserted into a stationary housing 110 from the opposite ends. The bearing members 112a and 112b are provided with inner bores or bearing surfaces 111a and 111b, respectively, for rotatably supporting a rotary shaft 113. The rotary shaft 113 is formed at its central portion with an enlarged portion 130, the opposite sides of which constitute thrust bearings with the inner ends of the bearing members 112a and 112b. A detailed description of the thrust bearings is omitted since they do not relate to a subject matter of the present invention. One end of the rotary shaft 113 near the bearing member 112a carries a grinding wheel 131 and the other end of the rotary shaft 113 near the bearing member 112b supports a pulley 132. Since the construction of the bearing member 112a is similar to that of the bearing member 12 shown in FIG. 1, only the differences therebetween is described.

As shown in FIGS. 11 to 14, the axial width of each rectangular fluid pocket 115, which is remote from the inner end 133 of the bearing member 112a, is smaller than that of each rectangular fluid pocket 116 which is near the inner end 113 of the bearing member 112a. Small raised lands 116b are circumferentially arranged only within each of the fluid pockets 116. Each of axial passages 118 for connecting the fluid pockets 115 and 116 is formed within the bearing member 112a at a position away from the bearing surface 111a so that a land portion 117 is in an annular form. A supply port 119 is formed within each of the fluid pockets 116 and extended to the outer periphery of the bearing member 112a. With this arrangement, the land portion 117 of the bearing member 112a is located more adjacent to the grinding wheel 131 from the axial center of the bearing member 112a.

The bearing member 112b on the pulley side has the same construction as that of the bearing member 112a with respect to the fluid pockets 115, 116, the small raised lands 116b, the land portion 117, the axial passages 118 and the supply ports 119. Therefore, the land portion 117 of the bearing member 112b is located more adjacent to the pulley 132 from the axial center of the bearing member 112b.

Figure 15:
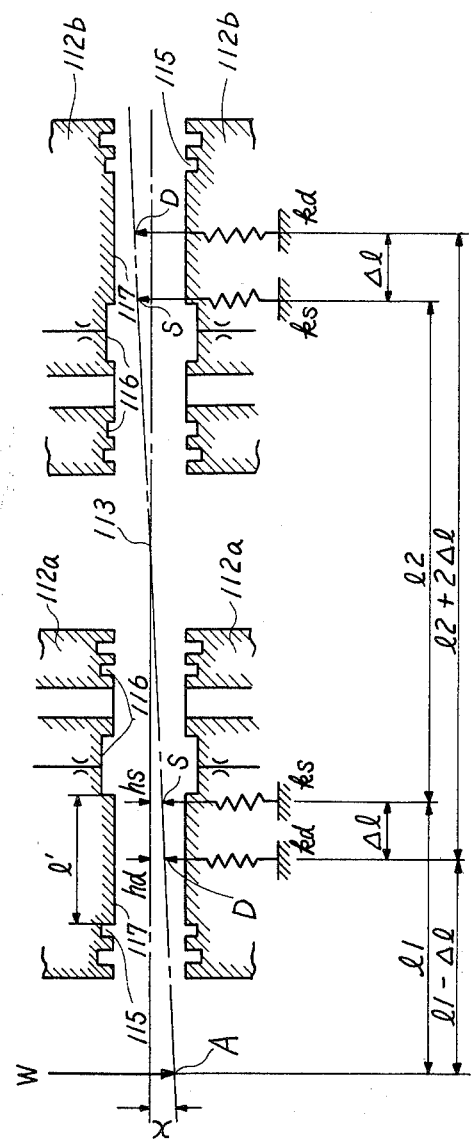
FIG. 15 is a schematic diagram showing the relationship between the supports of the bearing members in a stationary state and a rotational state of the rotary shaft.

FIG. 15 is a schematic diagram showing the relationship between the supports of the bearing members 112a and 112b in a stationary state and a rotational state of the rotary shaft 113. In the stationary state of the rotary shaft 113, hydrostatic pressure is generated over the entire axial widths of the bearing members 112a and 112b, so that support points S of the bearing members 112a and 112b are almost at the axial centers thereof. A distance between the support points S is represented as l2.

In the rotational state of the rotary shaft 112, hydrodynamic pressure, which is higher than hydrostatic pressure, is generated at the land portions 117 which are located outwardly from the axial centers of the bearing members 112a nad 112b. Accordingly, support points D of the bearing members 112a and 112b in the rotational state are located outwardly by Δl from the support points S in the stationary state, such that the span between the support points D is larger than that between the support points S. Therefore, bearing rigidity in the rotational state is higher than that in the stationary state.

Assuming that load W is applied to the rotary shaft 113 at a point A, which is spaced a distance l1 from the support point S of the bearing member 112a, displacement Xs of the rotary shaft 113 at the point A in the state is expressed as follows:

$$Xs = \frac{W}{Ks}\left\{1 + 2\left(\frac{l1}{l2}\right) + 2\left(\frac{l1}{l2}\right)^2\right\} \quad (1)$$

where Ks=rigidity due only to hydrostatic pressure.

When the rotary shaft 113 is rotated, hydrodynamic pressure is generated, resulting in increasing the rigidity from Ks into Kd and moving the support points from S into D. Accordingly, displacement Xd of the rotary shaft 113 at the point A in the rotationary state is expressed as follows:

$$Xd = \frac{W}{Kd}\left\{1 + 2\left(\frac{l1 - \Delta l}{l2 + 2\Delta l}\right) + 2\left(\frac{l1 - \Delta l}{l2 + 2\Delta l}\right)^2\right\} \quad (2)$$

It is understood by comparison of the equations (1) and (2) that the displacement Xd is much smaller than Xs, since Kd and l1/l2 are larger than Ks and $$\frac{l1 - \Delta l}{l2 + 2\Delta l}$$

respectively. Accordingly, rigidity in the rotational state is much larger than that in the stationary state. Furthermore, when the load W is applied to the rotary shaft 113 at the point A, displacement $h_d$ at the support point D of the bearing member 112a is always larger than displacement $h_s$ at the support point S, whereby bearing sensitivity in the rotational state is increased.

Figure 16:
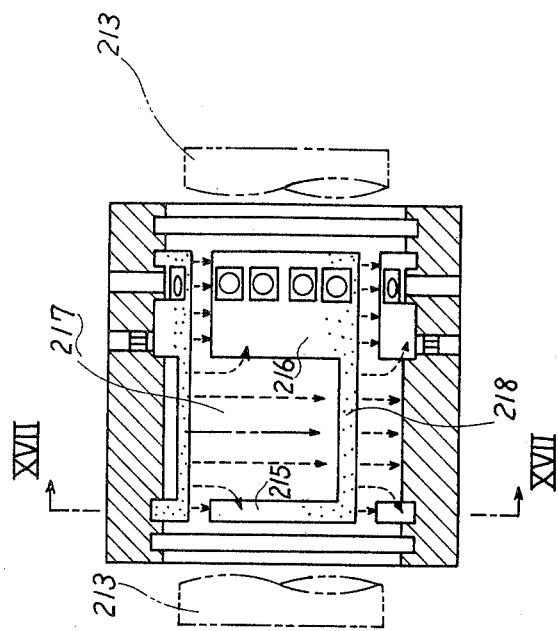
FIG. 16 is a longitudinal sectional view of another fluid bearing according to the present invention.
Figure 17:
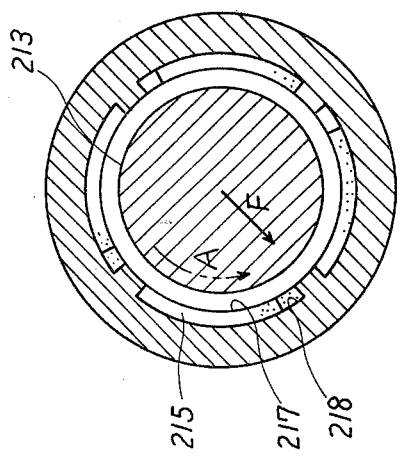
FIG. 17 is a sectional view taken along the lines XVII—XVII in FIG. 16.

Referring now to FIGS. 16 and 17, it is assumed that a rotary shaft 213 subjected to a radial load F at its one end is rotated in a direction A. An axial passage 218 connecting fluid pockets 215 and 216, which are located in the direction of the load F, is formed at a lower position in the gravitational direction. With this arrangement, even if a pressure fluid supply pump is stopped due to interruption of electric supply and thus generation of hydrostatic pressure disappears, a portion of fluid remains in the axial passage 218. Accordingly, even if the rotary shaft 213 continues to rotate due to its inertia immediately after stoppage of the supply pump, the remaining fluid in the axial passage 218 is smoothly introduced into a land portion 217 as indicated in dotted lines in FIG. 16, so that bearing seizure due to a lack of lubricating fluid may be prevented.

With respect to the fluid pockets 215, 216 and the axial passage 218, which are located in the direction opposite to that of the load F, the remaining fluid in the axial passage 218 formed at an upper position in the gravitational direction is moved toward the fluid pockets 215 and 216 due to its gravity and thus is not smoothly introduced into the land portion 217. However, this portion does not bear the load F, so that there is no fear of bearing seizure due to a lack of lubricating fluid.

Figure 18:
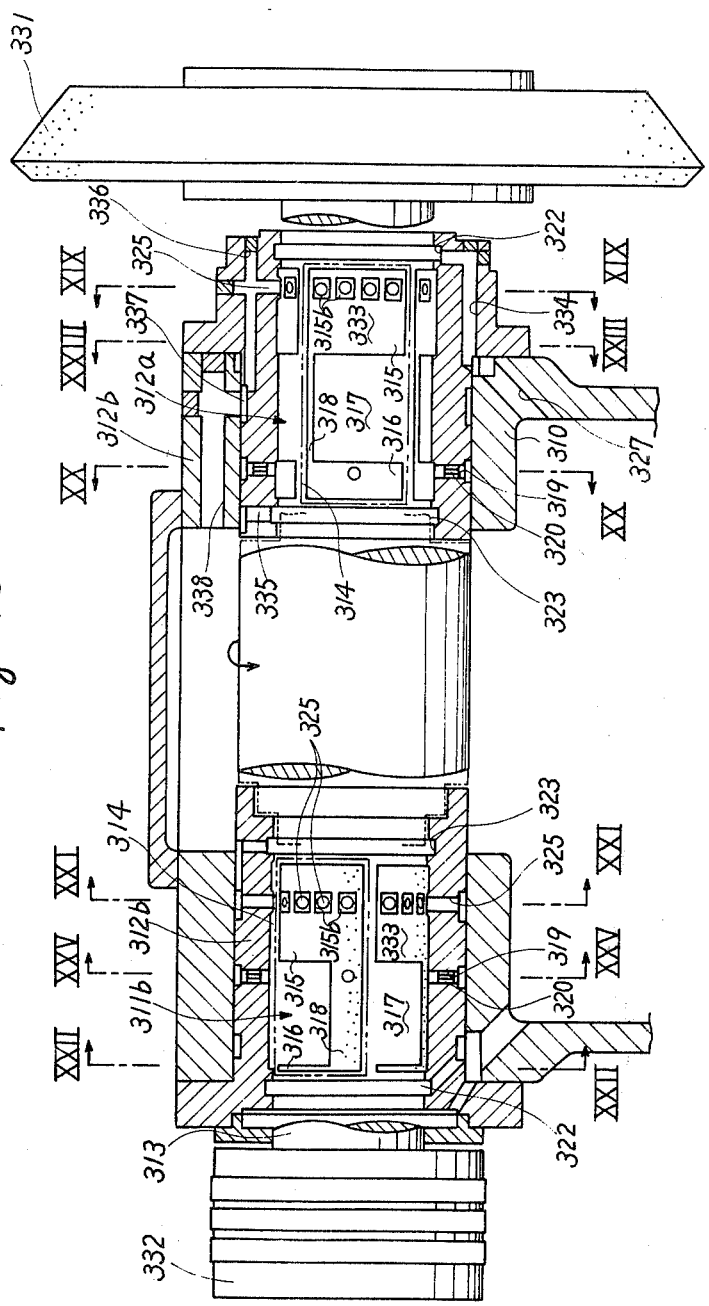
FIG. 18 is a longitudinal sectional view of still another fluid bearing according to the present invention.
Figure 20:
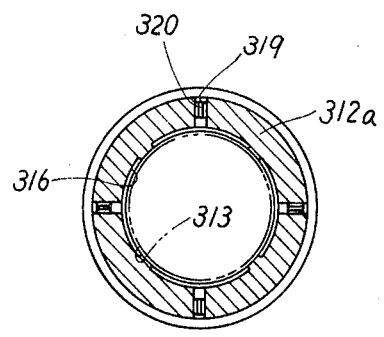
FIGS. 19 to 21, 23 and 25 are sectional views taken along the lines XIX—XIX to XXI—XXI, XXIII—XXIII and XXV—XXV in FIG. 18, respectively.
Figure 19:
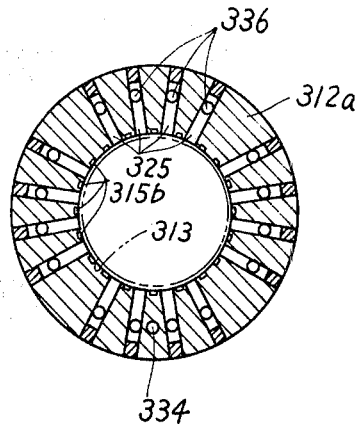
Figure 22:
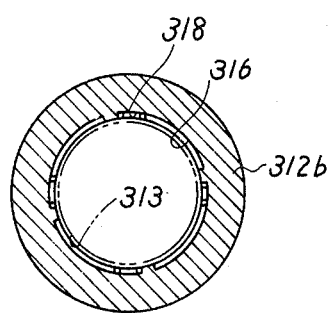
Figure 21:
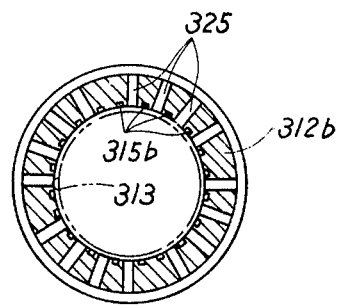

Another embodiment of the present invention will now be described with reference to FIGS. 18 to 26. As shown in FIG. 18, a pair of bearing members 312a and 312b are inserted into a stationary housing 310 from opposite ends. The bearing members 312a and 312b are provided with inner bores or bearing surfaces 311a and 311b, respectively, for rotatably supporting a rotary shaft 313. One end of the rotary shaft 313 near the bearing member 312a carries an angular type grinding wheel 331 and the other end of the rotary shaft 313 near the bearing member 312b supports a pulley 332.

As shown in dotted lines in FIG. 18, a plurality of pressure generating zones 314 are circumferentially arranged on each of the bearing surfaces 311a and 311b. Each of the pressure generating zones 314 is provided with a U-shaped fluid pocket 333 constituted by a pair of axially spaced fluid pockets 315 and 316 and an axially extending passage 318 connecting the pair of fluid pockets 315 and 316, a land portion 317 of the bearing surface formed between the pair of fluid pockets 315 and 316, a plurality of small raised lands 315b formed within the U-shaped fluid pocket 333, an exhaust port 325 formed on each small raised land 315b and connected to atmosphere and a supply port 319 for introducing pressurized fluid into the U-shaped fluid pocket 333 through a throttle member 320.

A pair of annular exhaust grooves 322 and 323 are formed outside the pressure generating zones 314. The annular exhaust groove 322 of the bearing member 312a located outwardly near the grinding wheel 331 communicates with one end of an axial passage 334 formed within the bearing member 312a at the lowermost position in the gravitational direction. The other end of the axial passage 334 communicates with atmosphere through a passage 327 formed within the bearing housing 310. The inner annular exhaust groove 323 of the bearing member 312a communicates with one end of a radial passage 335 formed within the bearing member 312a at the uppermost position in the gravitational direction. The other end of the passage 335 communicates with atmosphere. Each exhaust port 325 communicates with each aixal passage 336, which in turn communicates with an annular groove 337 formed on the outer periphery of the bearing member 312a. The annular groove 337 communicates with atmosphere through an axial passage 338 formed within the bearing housing 310 at the uppermost position in the gravitational direction.

Figure 23:
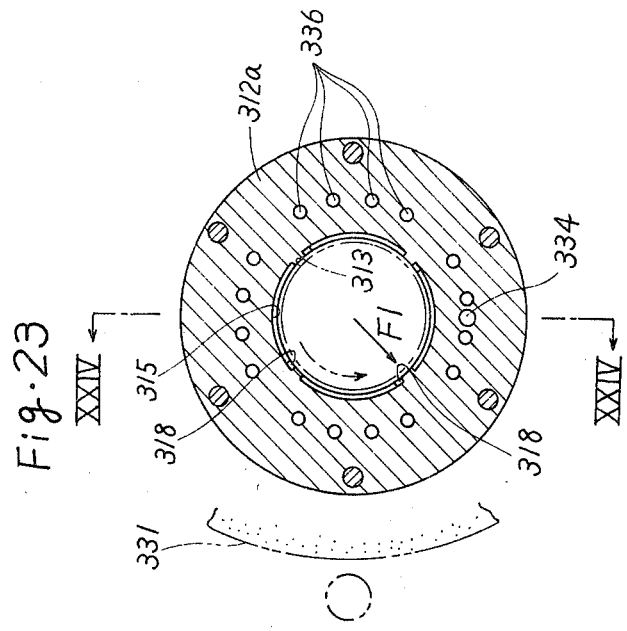
Figure 24:
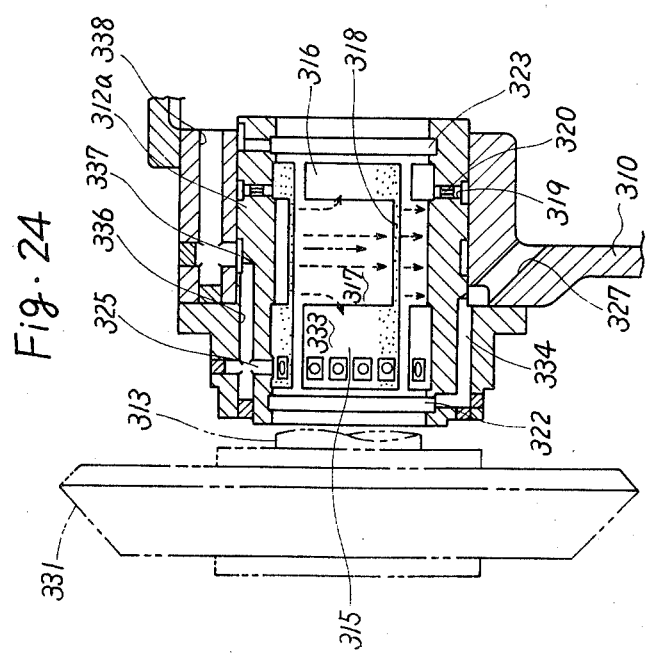
FIG. 24 is a sectional view taken along the lines XXIV—XXIV in FIG. 23.
Figure 25:
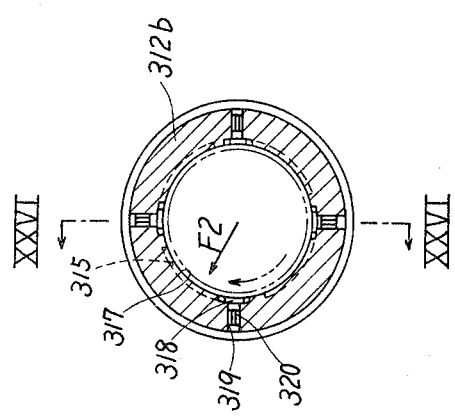
Figure 26:
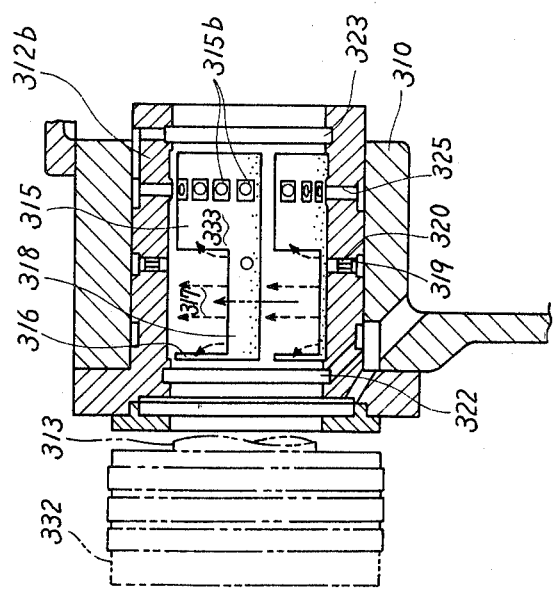
FIG. 26 is a sectional view taken along the lines XXVI—XXVI in FIG. 25.

As shown in FIGS. 23 and 24, the axial passage 318 of the bearing member 312a connecting the fluid pockets 315 and 316, which are located in the direction of a load F1, is formed at a lower position in the gravitational direction. The load F1 is defined as a result of the weight of the grinding wheel 331 and belt tension on the pulley 332, which is applied on the bearing member 312a when the rotary shaft 313 continues to rotate due to its inertia after stoppage of a pressure fluid supply pump. As shown in FIGS. 25 and 26, the axial passage 318 of the bearing member 312b connecting the fluid pockets 315 and 316, which are located in the direction of a load F2, is formed at a lower position in the gravitational direction. The load F2 is defined as a result of the weight of the grinding wheel 331 and the belt tension on the pulley 332, which is applied on the bearing member 312b when the rotary shaft 313 continues to rotate due to its inertia after stoppage of the pressure fluid supply pump.

In operation, fluid exhausted into the inner annular exhaust grooves 323 and exhaust ports 325 is discharged from the openings at the uppermost position in the gravitational direction. Accordingly, the grooves 323 and ports 325 are usually filled with fluid so that air is not introduced therefrom into the bearing surfaces 311a and 311b during rotation of the rotary shaft 313, thus resulting in an increase in bearing rigidity.

Moreover, even if the pressure fluid supply pump is stopped due to interruption of electric supply, the grooves 323 and ports 325 serve as a reservoir to store fluid so as to prevent bearing seizure due to lack of lubricating fluid.

Furthermore, even if the rotary shaft 313 continues to rotate due to its inertia immediately after stoppage of the pressure fluid supply pump, fluid in the axial passages 318 located in the direction of the loads F1 and F2 is smoothly introduced into the land portions 317, as indicated in dotted lines in FIGS. 24 and 26, so that bearing seizure due to lack of lubricating fluid may be prevented.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A fluid bearing for rotatably supporting a rotary shaft comprising:
a stationary housing;
a pair of bearing members fixedly and coaxially inserted in said housing from the opposite ends thereof, each bearing member having an internal bore which forms a bearing surface;
a plurality of pressure generating zones defined on each of said bearing surfaces in a circumferential direction;
a pair of axially spaced fluid pockets in each of said pressure generating zones, an axial width of one of said pair of fluid pockets which is located remote from the axially inner end of each bearing member being smaller than that of the other fluid pocket located near the inner end of each bearing member;

at least one raised land formed in at least one of said pair of fluid pockets in each of said pressure generating zones;

passage means for fluidically communicating said pair of fluid pockets with each other;

throttle means connected to said fluid pockets for admitting pressurized fluid in the same;

an exhaust port formed on said raised land for discharging pressurized fluid; and exhaust means formed on each of said bearing surfaces outside said pressure generating zones for discharging pressurized fluid.

2. A fluid bearing as claimed in claim 1, wherein said at least one raised land is formed in the other fluid pocket in each of said pressure generating zones.

* * * * *